Sept. 13, 1949.                    W. I. JONES                    2,482,067
                         SNAP FASTENER SOCKET MEMBER
                           Filed Nov. 16, 1944
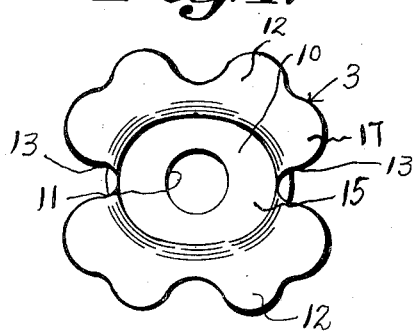
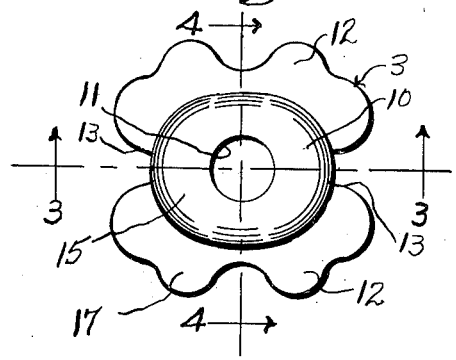
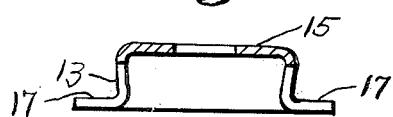
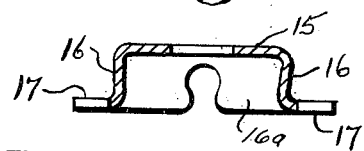
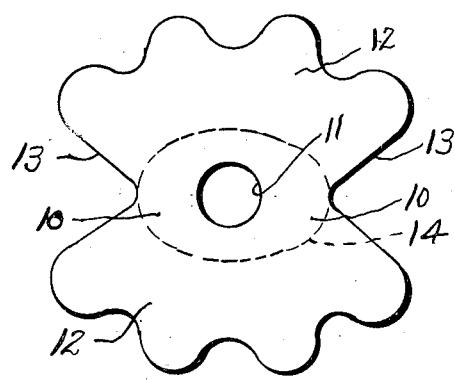
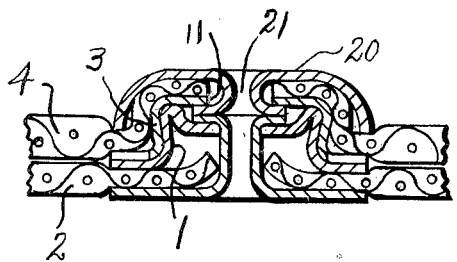
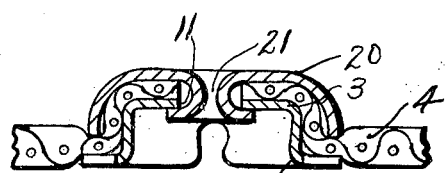
Inventor
Walter I. Jones Patented Sept. 13, 1949

2,482,067

UNITED STATES PATENT OFFICE 2,482,067

SNAP FASTENER SOCKET MEMBER

Walter I. Jones, Belmont, Mass., assignor to United-Carr Fastener Corporation, Cambridge, Mass., a corporation of Massachusetts Application November 16, 1944, Serial No. 563,719

3 Claims. (Cl. 24—217)

The present invention relates to snap fasteners and more particularly to the provision of an improved socket member for snap fastenings and aims generally to improve existing socket members of that type.

The primary object of the invention is the provision of a strong fastener socket which may be readily formed as a stamping from thin sheet metal, for example sheet steel, and subsequently heat-treated to impart to the socket the desired strength.

More specifically the invention aims to provide fastener sockets of extremely simple construction which will be very economical in cost of manufacture yet provide a strong durable fastener socket particularly adaptable for installations subject to severe strains such as workmen's clothes, and the like.

Illustrative of the invention reference is made to the accompanying drawings and annexed specification illustrating and describing a preferred form of the invention.

In the drawings

Fig. 1 is an enlarged inner plan view of a snap fastener socket member embodying the invention, viewing the interior of the stud-receiving part of the socket;

Fig. 2 is an enlarged outer plan view of the socket member shown in Fig. 1, viewing the exterior thereof;

Fig. 3 is a vertical sectional view of the socket member as taken on the line 3—3 of Fig. 2;

Fig. 4 is a vertical sectional view of the socket member as taken on the line 4—4 of Fig. 2;

Fig. 5 is an enlarged plan view of the blank of metal from which the socket member may be made;

Fig. 6 is an enlarged sectional view of one type of snap fastener socket installation embodying the invention;

Fig. 7 is an enlarged sectional view of a complete fastener illustrating the improved socket member as applied to a supporting strip or fabric and engaged with a stud.

Snap fastener installations conventionally comprise a stud member 1 (Fig. 7) attached to a suitable supporting base 2 such as a fabric or like strip, and adapted for snap fastening engagement with a cooperating socket member 3 suitably attached to a second supporting base or fabric strip 4. One of the cooperating stud or socket parts is resilient for snap fastening or locking engagement with the other part, and the present invention relates to that type of snap fastening in which the socket member is resilient for snap fastening engagement with a relative rigid stud 1. Such resilient socket members are uusually formed of brass and like relatively soft alloys in order that the desired resilience and thinness of material may be maintained. Such soft metal socket members are, however, easily damaged and deformed while subjected to hard and rough usage, as for example on workman's overalls, work suits and the like, to the point where the fastening may be inoperative.

The present invention aims to improve and simplify the construction of resilient socket fastenings by forming them from a blank of relatively stiff sheet metal such as sheet steel, so that the socket members may be subsequently heat-treated to increase the strength thereof, as well as the resistance to distortion under strain to more effectively withstand most severe usage.

According to the invention and particularly to the embodiment thereof shown in the drawing, the socket member 3 is advantageously formed from a single blank of sheet material, for example sheet steel. Preferably the blank has a central body portion 10 centrally apertured as at 11, and a pair of segmental portions 12, substantially semi-elliptical in shape and joining the body portion along a major axis thereof by V-shaped notches 13. Thus the segmental portions are separate and provide independently resilient socket halves.

The body portion 10 of the blank provides the crown of the socket member and the blank may be deformed substantially along the dotted lines 14 (Fig. 5) to provide an elliptical or elongated circular crown 15 having angularly extending inwardly converging stud-engaging walls 16 which are formed from the segmental sections 12 and define between them a stud-receiving opening 16ᵃ. The outer marginal edge portions of the segments may be outwardly flanged as at 17 to provide support-gripping faces or flanges, the edges of which may be scalloped and while shown flat in the drawing may be slightly upturned to provide increased gripping engagement with a fabric support as desired.

The socket member thus formed comprises an elliptical or elongated circular crown 15 and a pair of semi-elliptical or elongated circular sides extending from portions of the periphery of the crown in line with the minor axis thereof, the ends of the sides being joined to the crown substantially in line with the major axis thereof. The major axis of the socket is of a dimension to receive the cooperating circular stud 1 while the minor axis of the stud, i. e. the axis normal to the centers of the segmental sides, is slightly less than the diameter of the stud head, so as to be laterally expandible to engage and lock with the stud head with a snap fastener action.

My improved socket member may be attached to the supporting fabric 4 in any suitable manner, but preferably an attaching cap 20 is provided which may have a dome-shaped body of a size to overlie and grip a substantial area of the support overlying the socket member 3. The member 20 is preferably formed with a central tubular eyelet 21 adapted to penetrate the support 4 and the aperture 11 of the socket 3 and be upset over the inner face of the crown 15 of the socket as illustrated in Fig. 6.

As stated above, the socket member 3 may be formed of relatively stiff material such as thin sheet steel, which may be heat-treated for hardness to increase its strength and resistance to deformation when in use, but any other material that will produce the desired result will be satisfactory. The invention thus provides an extremely efficient socket capable of withstanding extremely heavy strains and stresses and which is highly suitable for more rugged installations, such as workmen's work clothing and the like. The socket is also designed to be made from the smallest blank known for the type of socket illustrated. Four segment round sockets are known, but they are weaker in construction and are made from a much larger blank of metal.

My invention is not to be restricted to the specific embodiment shown in the drawings as the scope of the invention is best defined in the appended claims.

I claim:

1. A snap fastener socket member adapted for snap fastener engagement with a rigid circular stud, and comprising an elliptical hollow body of sheet metal provided with an elliptical crown and a pair of oppositely disposed inwardly converging depending segments one of which is connected to each elongated side of said crown and extending from points near the mid-ends thereof, said segments being separated from each other at the mid-ends of said crown to provide separate transversely yieldable elliptically arcuate stud-engaging segments adapted for limited arc contact with a circular stud to be engaged thereby, the free edge portions of said segments being outwardly flanged throughout substantially the length thereof providing a support-gripping surface and a reinforcement against transverse distortion of said segment edge portions.

2. A snap fastener socket member adapted for snap fastener engagement with a rigid circular stud, and comprising an elliptical hollow body of sheet metal provided with an elliptical crown having a central aperture and a pair of oppositely disposed inwardly converging depending segments one of which is connected to each elongated side of said crown and extending from points near the mid-ends thereof, said segments being separated from each other at the mid-ends of said crown to provide separate transversely yieldable elliptically arcuate stud-engaging segments adapted for limited arc contact with a circular stud to be engaged thereby, the free edge portions of said segments being outwardly flanged throughout substantially the length thereof providing a support-gripping surface and a reinforcement against transverse distortion of said segment edge portions and a dome-shaped attaching cap having a central inwardly extending support-piercing eyelet extended through the aperture of said crown and upset against the inner face thereof, said elliptical crown and cap providing support-gripping surfaces throughout substantially the entire area of the opposed surfaces of the elliptical hollow body and cap.

3. A snap fastener socket member as defined in claim 1 characterized in that the elliptical hollow body portion is formed of metal capable of being heat-treated to impart stiffness to the depending segments.

WALTER I. JONES.

REFERENCES CITED

The following references are of record in the file of this patent:

UNITED STATES PATENTS

| Number | Name | Date |
| --- | --- | --- |
| 623,688 | Richardson | Apr. 25, 1899 |
| 860,679 | Lewis | July 23, 1907 |
| 1,206,829 | Fauteux | Dec. 5, 1916 |
| 1,387,124 | Carr | Aug. 9, 1921 |
| 1,692,701 | Reiter et al. | Nov. 20, 1928 |

FOREIGN PATENTS

| Number | Country | Date |
| --- | --- | --- |
| 795 | Great Britain | Feb. 13, 1883 |